_United States Patent Office_

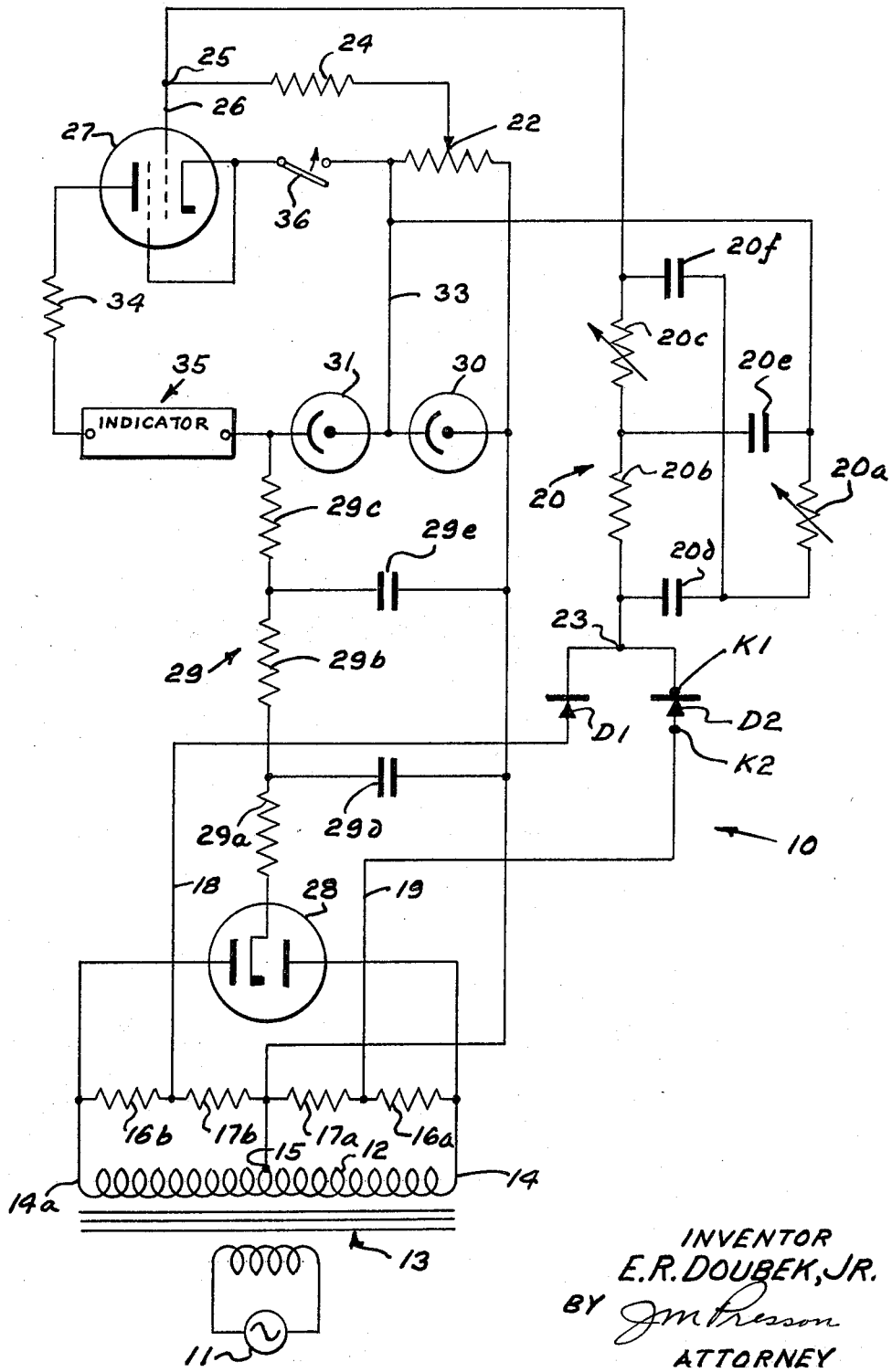

3,286,182
Patented Nov. 15, 1966

3,286,182
FULL-WAVE VERSUS HALF-WAVE DISCRIMINATING RECTIFICATION APPARATUS FOR TESTING ELECTRICAL CHARACTERISTICS OF A DIODE
Edward R. Doubek, Jr., Brookfield, Ill., assignor to Western Electric Company, Incorporated, New York, N.Y., a corporation of New York
Continuation of abandoned application Ser. No. 200,175, June 5, 1962. This application June 11, 1965, Ser. No. 466,511
5 Claims. (Cl. 324—158)

This invention relates generally to electrical component testing devices, and more specifically to a device for testing diodes.

This application is a continuation of copending U.S. application Serial No. 200,175, filed June 5, 1962, now abandoned.

Large numbers of diodes are currently employed in the construction of printed circuit boards and other types of electronic assemblies. However, before the diodes can be incorporated into a circuit it is necessary to perform tests for determining the forward to reverse resistance ratio and for determining whether or not the current passing direction of the diodes corresponds to their labelled current passing direction.

Presently the techniques used for determining the forward and reverse resistance of diodes involves testing each diodes with an ohm-meter or a curve tracer. Using these techniques, the forward and reverse resistance of each diode is measured separately thereby necessitating removing and reversing each diode in the ohm-meter to accomplish both measurements. Thereafter, the directional characteristics of the diode must also be checked before the diode is incorporated in a circuit in order to establish whether or not the diode is properly aligned in its labelled current passing direction.

Broadly, it is an object of this invention to provide a diode testing device wherein a diode can be tested in a single operation, the required minimum value for the forward to reverse resistance ratio as well as the directional characteristic of the diode being checked simultaneously by the device.

More specifically, it is an object of this invention to provide a test device of the above character wherein the forward to reverse resistance ratio of the tested diode is automatically compared to that of a reference diode, and wherein the directional characteristic of the diode under test is also simultaneously ascertained.

Other objects, advantages and novel aspects of the invention will become apparent upon reference to the following detailed description, taken in conjunction with the appended drawing, in which the diode testing device of this invention is shown.

According to this invention a diode tester is provided, which includes a rectifying circuit adapted to receive a diode under test, the characteristics and directional orientation of that diode being compared to the characteristics and orientation of a reference diode permanently connected in the rectifying circuit. When the diode under test is inserted into the rectifying circuit it essentially converts the rectifying circuit from a half-wave rectifier to a full-wave rectifier. A discriminator is provided which in response to full-wave rectification of a prescribed quantity, as measured by the amplitude of a component harmonic frequency of electrical signal representative of full-wave rectification, discriminates at an amplitude indicative of a desired forward to reverse resistance ratio of the diode under test.

In a preferred embodiment, such discriminator includes a filter connected to the output of the rectifying circuit which filters out the fundamental harmonic frequency of the alternating current source and passes the second harmonic when the diode under test functions properly and is properly orientated to pass the source current. An electron discharge device which is rendered normally nonconductive when not in operation is rendered conductive when the voltage of the second harmonic passed by the filter is applied to the control grid of the discharge device. A variable impedance is connected to the control grid and is adjustable so that only voltage signals from the filter network having some pre-established minimum amplitude level will cause conduction in the discharge device. Thus if the characteristics of the diode under test do not meet some standard as established by the reference diode and the variable impedance, the diode under test will be unacceptable.

Referring now to the drawing for a more complete understanding of this invention it is seen that the diode testing device is formed by a normally half-wave rectifying circuit referred to by the numeral 10 in which the diode $D_1$ is permanently connected as a reference diode or standard against which the characteristics of the diode $D_2$ under test is to be compared. The diode $D_1$ is properly orientated with respect to its labelled current passing direction in the rectifying circuit 10. The rectifying circuit 10 is designed to receive the diode $D_2$ between normally open contacts $K_1$ and $K_2$ so that the half-wave rectifying circuit 10 is converted to a full-wave rectifying circuit upon insertion of the diode $D_2$ therein in the proper current passing direction.

A source 11 of alternating current, of for example, 60 cycles per second, is used to bias the diode tested and it will be understood that different frequency sources can also be used if the various components forming the testing device are redesigned to function at that different frequency.

The secondary coil 12 of a step-up transformer 13 is connected at the ends thereof by the leads 14 and 14a and at the center thereof by a center tap 15. The resistors 16a, 17a and 16b, 17b are respectively connected in parallel to the transformer 13 between the leads 14 and 14a and the center tap 15. The resistors 16a and 16b allow tapping of the transformer 13 as by the conductors 18 and 19 so as to provide a safe operating voltage for the operator if the diode $D_2$ is manually loaded in the tester and yet provide voltage having an amplitude such that the diode $D_2$ can be tested at the desired voltage level. The resistors 16a and 16b also limit the amount of current the diodes can draw so that the reference diode $D_1$ will not be damaged if the diode $D_2$ is shorted.

A frequency sensitive filter network 20 comprising the resistors 20a, 20b and 20c and the capacitors 20d, 20e and 20f is designed to recognize the difference in the harmonic content of an electrical signal between full and half-wave rectification, and to select a component harmonic which in a Fourier series analysis of the signal is representative of full-wave rectification. This may be accomplished, for example, by designing the network 20 to filter out the fundamental frequency of the source voltage (representative of half-wave rectification) and pass voltages rich in the second harmonic which is representative of full-wave rectification to a variable resistor 22. While a resistance-capacitance filter 20 is illustrated, other types of filters can alternatively be used, as will be evident to those working in the art.

Since a 60 cycle per second source of current is being used, the filter 20 is designed to filter out the fundamental of 60 cycles per second and pass the second harmonic of 120 cycles per second. If the diode $D_2$ is absent from the rectifying circuit or is open or shorted, the voltage at the terminal 23 will be rich in the fundamental which will then be filtered out by the filter 20 so that the voltage at the terminal 25 will be zero or very close to zero, the proximity to zero being dependent upon the efficiency at which the filter 20 operates. If the diode $D_2$ is reversed from the labelled current passing direction in the rectifying circuit 10 current will only be passed by the diode $D_1$ and this current will be filtered out so that the voltage at the terminal 25 will again be zero or very close to zero.

A test diode $D_2$ which is not open or shorted, and which has a proper directional characteristic, generally provides full-wave rectification and the representative second harmonic signal will pass through the filter 20. However, the quality of the full-wave rectification depends upon the forward to reverse resistance ratio of the test diode $D_2$ as compared to that of the standard diode $D_1$. Since the forward to reverse resistance ratio of the standard diode $D_1$ is fixed as a reference level, the quality of full-wave rectification is made to depend upon the forward to reverse resistance ratio of the test diode $D_2$. Thus, the filter network 20 isolates the second harmonic frequency so that the quality of full-wave rectification, and more particularly the forward to reverse resistance ratio of the test diode $D_2$, may be measured. When the diode $D_2$ compares favorably with the standard diode $D_1$, the voltage at the terminal 23 will be rich in the second harmonic which will be passed by the filter 20 so that the voltage at the terminal 25 will be rich in the 120 cycle frequency.

The amplitude of the second harmonic voltage signal passed by the filter 20 is representative of the quality of full-wave rectification, and since such quality depends upon the forward to reverse resistance ratio of the test diode $D_2$, the amplitude of the second harmonic signal may be monitored for a prescribed minimum value indicative of a maximum acceptable forward to reverse resistance ratio for the diode under test. In the preferred embodiment, a control grid 26 of a thyratron tube 27 is brought out to a resistor 24 and to the variable resistor 22. Resistance values of the resistors 22 and 24 can be varied such that a minimum voltage must be applied to the grid 26 before the thyratron will fire. Thus the resistor 22 can be adjusted to establish a level of discrimination in the amplitude of the second harmonic signal corresponding to the lower limit of the forward to rearward resistance ratio that the diode $D_2$ must have before the thyratron tube 27 will fire. A B+ voltage source for the thyratron 27 is provided by a rectifier tube 28 and a resistance-capacitance filter, referred to generally by the numeral 29, comprising resistors 29a, 29b, 29c and capacitors 29d and 29e. A pair of conventional voltage regulating tubes 30 and 31 are provided in the circuit to insure stable operation of the thyratron 27. A current limiting resistor 34 is connected to the output of the thyratron 27 and to an indicator 35 which may be a light, buzzer or the like.

A normally open switch 36 is manually closed after the diode $D_2$ is inserted into the rectifying circuit, and if the diode $D_2$ meets the standard as established by the diode $D_1$ and the variable resistor 22, and is properly orientated in the direction of its labelled current passing direction, the thyratron tube 27 will conduct to energize the indicator 35. After each test the switch 36 is manually opened again to de-energize the tube 27 in preparation for subsequent tests.

As will be apparent to those skilled in the art, the diode testing device of this invention can be used in combination with mechanism for inserting the diodes under test between the contacts K1 and K2, and thereafter rotating the diode 180° if the diode initially fails to pass the directional characteristic test. Further, it is obvious that best sensitivity may be obtained where the forward to reverse resistance ratio of the standard diode equals that desired of the test diode, but other values may be used so long as they are compatible with the discriminating criterion of a prescribed quality level of full-wave rectification.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A diode testing device for simultaneously comparing the forward to reverse resistance ratio of the diode under test to that of a reference diode and determining if the labelled directional characteristic of the diode under test is correctly oriented with the true current passing direction thereof, the device comprising:
    a source of alternating current;
    a diode rectifying circuit connected to said source, one diode in said circuit being connected therein as a reference diode;
    means in said circuit for receiving a test diode therein, the insertion of the test diode in said circuit converting said circuit from a half-wave rectifier to a full-wave rectifier when the current passing direction of the test diode corresponds to the labelled directional characteristic thereof;
    a network connected to the output of said rectifying circuit for filtering out the fundamental harmonic of the alternating current source and passing higher-order harmonics produced by full-wave rectification;
    an electron discharge device connected to the output of the network; and
    means for controlling the conduction of said electron discharge device in response to the output of said network so that said discharge device is rendered conductive by a voltage signal of some predetermined minimum amplitude indicative of a maximum acceptable forward to reverse resistance ratio of the test diode.

2. A diode testing device for simultaneously comparing the forward to reverse resistance ratio of the diode under test to that of a reference diode and determining if the labelled directional characteristic of the diode under test is correctly oriented with the true current passing direction thereof, the device comprising:
    a source of alternating current;
    a diode rectifying circuit connected to said source, one diode in said circuit being connected therein as a reference diode;
    means in said circuit being adapted to receive a test diode therein, the insertion of the test diode in said circuit converting said circuit from a half-wave rectifier to a full-wave rectifier when the current passing direction of the test diode corresponds to the labelled directional characteristic thereof;
    a filter connected to the output of said rectifying circuit for filtering out the fundamental harmonic of the alternating current source and passing higher-order harmonics produced by full-wave rectification;
    an electron discharge device connected to the output of said filter;
    means for normally rendering said discharge device nonconductive and for rendering said discharge device conductive in response to a voltage signal passed by the filter having some predetermined minimum amplitude indicative of a maximum acceptable forward to reverse resistance ratio of the test diode; and
    means for indicating the presence of an acceptable test diode in said circuit connected to said discharge device and energized by operation thereof.

3. A diode testing device for simultaneously determining if the forward to reverse resistance ratio of the diode under test is equal to or less than that of a reference diode and the labelled directional characteristic of the diode under test is correctly oriented with the true current passing direction thereof, the device comprising:
    a source of alternating current;
    a diode rectifying circuit connected to said source, one diode in said circuit being permanently connected therein as a reference diode;

a pair of open contact elements in said circuit for receiving a test diode therebetween, the insertion of the test diode in said circuit converting said circuit from a half-wave rectifier to a full-wave rectifier when the current passing direction of the test diode corresponds to the labelled directional characteristics thereof;

means for indicating the presence of an acceptable test diode in said circuit;

a filter connected to the output of said rectifying circuit for filtering out the fundamental harmonic of the alternating current source and passing higher-order harmonics produced by full-wave rectification;

a normally nonconductive electron discharge device connected to the output of said filter including at least two electrodes and a control grid between said electrodes for rendering said discharge device conductive, one electrode connected to the alternating current source, and other electrode connected to the indicating means for energizing said means upon operation of said discharge device; and variable impedance means connected to the output of said filter and to said control grid for producing a biasing voltage on said grid, said impedance means being adjusted such that only a voltage signal passed by said filter having some predetermined minimum amplitude causes operation of said discharge device.

4. A test circuit for determining the rectification characteristics of a diode, which comprises:

a source of alternating current;

a diode rectifying circuit connected to said source, said circuit including a reference diode for rectifying alternate half-cycles of the current;

means arranged in said rectifying circuit to receive a test diode for rectifying half-cycles of the current which are complementary to said alternate half-cycles of the current, thereby normally converting said rectifying circuit to a full-wave rectifier;

filter means connected to the output of said rectifying circuit for at least partially suppressing the fundamental signal frequency and for selectively differentiating an electrical signal comprised of at least one uninhibited higher-order component harmonic frequency representative of full-wave rectification; and means responsive to the electrical output signal of said filter means for discriminating at a predetermined amplitude the higher-order component frequency representative of full-wave rectification, the attainment by said output signal of said predetermined amplitude being indicative of a minimum acceptable quality of rectification effected by the test diode.

5. A circuit for comparing the forward to reverse resistance ratio of a diode under test to that of a reference diode, which comprises:

a source of alternating current;

a diode rectifying circuit connected to said source and including a reference diode for rectifying alternate half-cycles of the current;

means for arranging a test diode in said rectifying circuit to form a full-wave rectifier, said test diode rectifying half-cycles of current which are complementary to said alternate half-cycles;

a network connected to said rectifying circuit for filtering out the fundamental harmonic in the output signal thereof and for passing higher-order harmonics produced by full-wave rectification;

means responsive to the output signal of said network, for discriminating at a predetermined amplitude of the higher-order harmonic frequencies indicative of full-wave rectification, said predetermined amplitude corresponding to a maximum acceptable forward to reverse resistance ratio of the test diode; and means responsive to the discriminating means for indicating whether the test diode possesses the desired forward to reverse resistance ratio.

References Cited by the Examiner
UNITED STATES PATENTS 2,522,369   9/1950   Guanella _____ 324—128 X
3,064,190   11/1962  Inderweisen _____ 324—128 X

OTHER REFERENCES

Electronics (Ives), March 1, 1957, pp. 194–195.
Vacuum Tube Circuits and Transistors (Arguimbau), 1956, pp. 21–25.

WALTER L. CARLSON, *Primary Examiner.*

E. L. STOLARUN, *Assistant Examiner.*